(12) United States Patent
Bachmat

(10) Patent No.: US 6,275,897 B1
(45) Date of Patent: Aug. 14, 2001

(54) REMOTE CACHE UTILIZATION FOR MIRRORED MASS STORAGE SUBSYSTEM

(75) Inventor: Eitan Bachmat, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/877,092

(22) Filed: Jun. 17, 1997

(51) Int. Cl.$^7$ ............................................ G06F 12/00
(52) U.S. Cl. .............................. 711/114; 711/162; 714/6
(58) Field of Search .................................. 711/113, 114, 711/162; 399/182.04; 714/6

(56) References Cited

PUBLICATIONS

Patterson, David A. et al. Introduction to Redundant Arrays of Inexpensive Disks (RAID). IEEE. Apr. 1989. pp. 112–117.*

* cited by examiner

Primary Examiner—Kevin Verbrugge
(74) Attorney, Agent, or Firm—Richard A. Jordan; John M. Gunther

(57) ABSTRACT

A digital computer system includes a master mass storage subsystem and a slave mass storage subsystem which provides mirrored storage for the master mass storage subsystem. One or more host computer systems can access information in the master mass storage subsystem to retrieve information from, and update information stored in, the master mass storage subsystem. When a host computer accesses information in the master mass storage subsystem, the information is cached in the master mass storage subsystem's cache memory, and when the information is updated, the update information will be updated in both mass storage subsystem's cache memories prior to being stored in their respective storage devices. When a host computer wishes to retrieve information, if the information is not in the cache of the master mass storage subsystem, if the information is still in the cache of the slave mass storage subsystem from a prior update operation, the host computer will enable the information to be transferred from the slave mass storage subsystem to the master mass storage subsystem for access by the host computer. Otherwise (that is, if the information is not in the cache of the master mass storage subsystem), the host computer will enable the information to be retrieved from the master mass storage subsystem's storage devices and cached in the master mass storage subsystems's cache memory prior to being retrieved by the host computer.

7 Claims, 5 Drawing Sheets

REMOTE CACHE UTILIZATION FOR MIRRORED MASS STORAGE SUBSYSTEM

FIELD OF THE INVENTION

The invention relates generally to the field of digital data processing systems, and more particularly to caching systems and methods for use in mass storage subsystems for use in such systems.

BACKGROUND OF THE INVENTION

In modem "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

Given the importance of the availability of information to an enterprise, several strategies have been developed to provide for enhanced safety and availability of data stored in a mass storage system in the event of a failure or other malfunction. In one strategy, data stored on, for example, a disk storage subsystem will be periodically backed up onto another, less expensive medium, such as magnetic tape. While such a strategy can be provide some use protection, it does suffer some drawbacks. First, since the data is only periodically backed up, data that has been updated or modified since the last backup will not be protected. In addition, for a large mass storage subsystem, the time required to perform a back-up can be quite long, which can interfere with access to the mass storage subsystem by others in the enterprise. In addition, if a failure or other malfunction does occur, if the mass storage subsystem is large the time required to transfer the information from the tape to another mass storage subsystem for use by the enterprise can be quite lengthy.

Other strategies for providing enhanced safety and availability for the information stored on disk storage subsystems make use of additional disks drives and spreading the information across the disk drives. In one such strategy, termed "RAID" (an acronym for "Redundant Array of Inexpensive Disks") information is striped across a plurality of disk drives. At least one additional disk drive, than those required for the information, is provided to store parity or other error correction information so that, if one of the disk drives in the mass storage subsystem fails or otherwise malfunctions, the information from the other disk drives, along with the parity information from the additional disk drive, can be used to regenerate the information that had been stored on the malfunctioning disk drive. While a RAID strategy can be useful in providing enhanced safety and availability, it does require complex and sophisticated controller arrangements for efficiently striping the information across the respective disk drives and generating the appropriate parity information for storage on the additional disk drive.

A second such strategy, termed "mirroring," provides safety and availability of information at least as well as, if not better than, that provided by the RAID strategy, while potentially requiring far less sophisticated controllers. In mirroring, the entire contents of one, for example, mass storage subsystem, are replicated on one or more other mass storage subsystems. Thus, if one or more disk drives on one of the mass storage subsystems fails, the information is immediately available to the enterprise from the another mass storage subsystem. Thus if a catastrophic failure occurs at one mass storage subsystem, such as the failure or malfunction of a number of disk drives or destruction of the entire mass storage subsystem, in a mirrored arrangement the information would still be available from the another mass storage subsystem, which may not be possible in a RAID system. The mirrored mass storage subsystems may be physically located proximate to each other. Alternatively, the mirrored mass storage subsystems may be separated by a significant distance, which will allow information to be available from at least one mass storage subsystem even if the other is destroyed by fire, natural disaster, or the like, which also would not be possible in a RAID system.

One mass storage subsystem useful in such an enterprise is described in, for example, U. S. Pat. No. 5,206,939, entitled System And Method For Disk Mapping And Data Retrieval, issued Apr. 27, 1993 to Moshe Yanai, et al (hereinafter, "the '939 patent"), U.S. patent appliction Ser. No. 07/893,509 filed Jun. 4, 1992 in the name of Moshe Yanai, et al., entitled "System And Method For Dynamically Controlling Cache Management," now U.S. Pat. No. 5,381 539, issued Jan. 10, 1995 and U.S. Pat. No. 5,592,432, entitled Cache Management System Using Time Stamping For Replacement Queue, issued Jan. 7, 1997 in the name of Natan Vishlitzky, et al., (hereinafter "the '432 patent"), all of which are assigned to the assignee of the present invention and incorporated herein by reference. Those patents generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer information that is transferred from the storage devices for use by the respective computers, and, if the data has been modified, transferred back to the storage devices for storage. If such a mass storage subsystem is used in a mirrored arrangement, one of the mass storage subsystems, termed here a "master" subsystem, may be used to service retrieval and storage requests, and the other mass storage subsystem, termed here a "slave" subsystem, may be used to provide mirroring for the information in the master subsystem. In that case, generally, the cache of the master subsystem will be used to buffer both information for retrieval requests and storage requests, whereas the cache for the slave subsystem will generally buffer only information for storage requests, which have been provided thereto by the master subsystem for storage. In such an arrangement, the cache of the slave subsystem may be under-utilized.

SUMMARY OF THE INVENTION

The invention provides a new and improved caching systems and methods providing remote cache utilization for a mass storage subsystems for use in a digital computer system.

In brief summary, a digital computer system includes a master mass storage subsystem and a slave mass storage subsystem which provides mirrored storage for the master mass storage subsystem. One or more host computer systems can access information in the master mass storage subsystem to retrieve information from, and update information stored in, the master mass storage subsystem. When a host computer accesses information in the master mass storage subsystem, the information is cached in the master mass storage subsystem's cache memory, and when the information is updated, the update information will be updated in both mass storage subsystem's cache memories prior to being stored in their respective storage devices. When a host computer wishes to retrieve information, if the information is not in the cache of the master mass storage subsystem, if the information is still in the cache of the slave mass storage subsystem from a prior update operation, the host computer will enable the information to be transferred from the slave mass storage subsystem to the master mass storage subsystem for access by the host computer. Otherwise (that is, if the information is not in the cache of the master mass storage subsystem), the host computer will enable the information to be retrieved from the master mass storage subsystem's storage devices and cached in the master mass storage subsystems's cache memory prior to being retrieved by the host computer.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
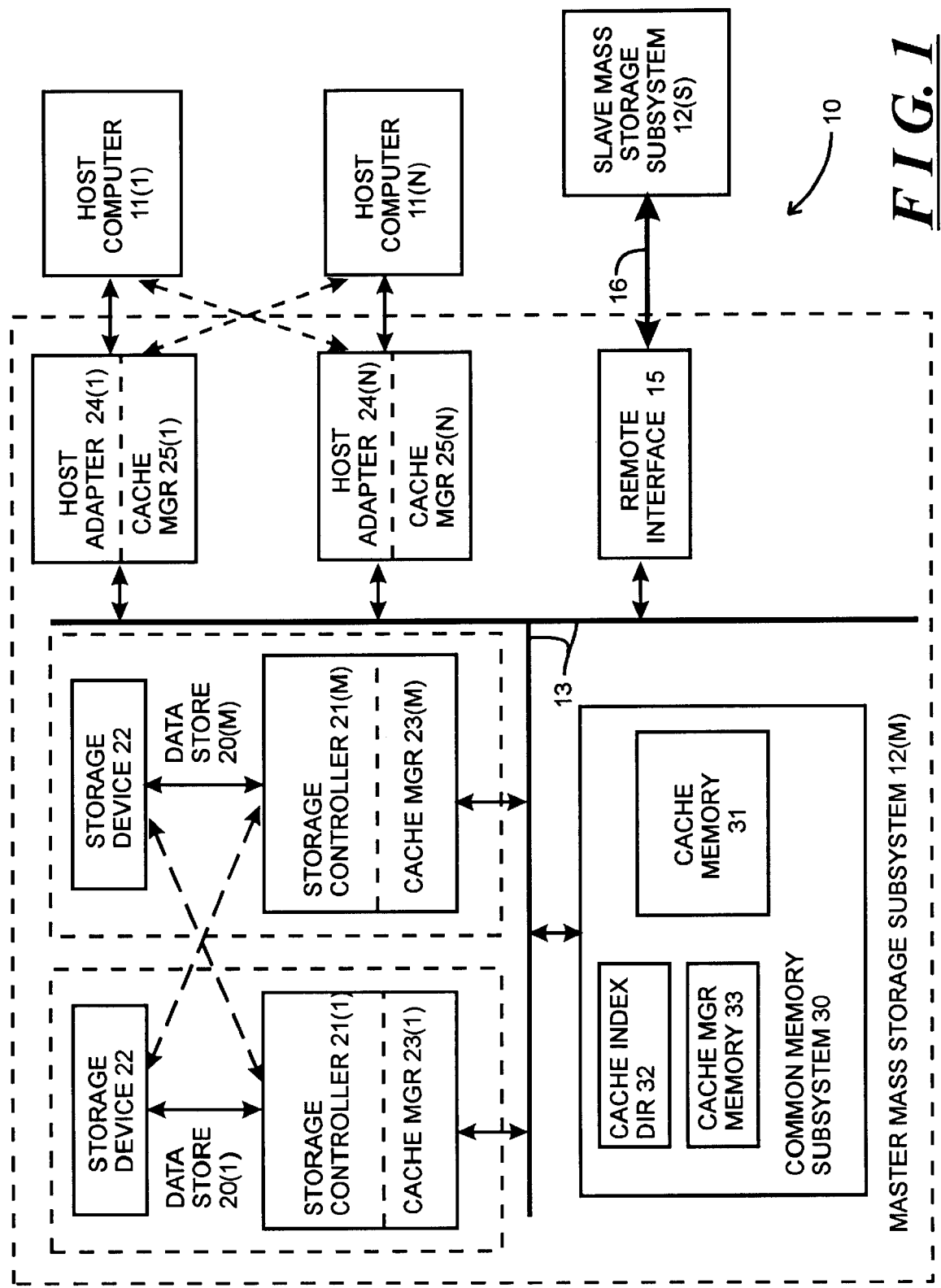
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11($n$)) connected to a master mass storage subsystem 12M. Each host computer 11($n$) may comprise, for example, a personal computer, workstation, or the like which may be used by a single operator, or a multi-user computer system which may be used by a number of operators. The master mass storage subsystem 12M stores data and other information that is utilized by the host computers 11($n$) in their processing, and stores processed or otherwise updated information transferred to it by the host computers 11($n$) for storage. The master digital data storage system 12M, in turn, is connected over a communication link 16 to a slave mass storage subsystem 12S which provides mirrored storage for the information stored in the master mass storage subsystem 12M.

The master mass storage subsystem 12M in one embodiment is generally similar to the mass storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). The slave mass storage subsystem 12S, in one embodiment, is also similar to the mass storage subsystem described in the '939 patent, and is also similar to master mass storage subsystem 12M, with such exceptions as will be noted below. The master mass storage subsystem 12M comprises one or more data stores 20(1) through 20(M) (generally identified by reference numeral 20($m$)), one or more host adapters 24(1) through 24(N) (generally identified by reference numeral 24($n$)), and a common memory subsystem 30, all of which are interconnected by one or more common buses generally identified by reference numeral 13. The master mass storage subsystems 12M also includes a remote interface 15 for communicating over communication link 16 with the slave mass storage subsystem 12S as described below.

The host adapters 11($n$) operate to interface the host computers 11($n$) to the master mass storage subsystem 12M, and in that connection receive storage and retrieval requests from the respective host adapters 11($n$), transfer (in the case of a storage operations) the information to be stored to other components of the subsystem 12 for storage, and retrieve (in the case of a retrieval operation) the information to be retrieved from other components of the subsystem 12 for provision to the respective host computer 11($n$). Generally, retrieval operations and storage operations in connection with the master mass storage subsystem 12M will collectively be referred to as "access operations."

The data stores 20($m$) store information in the form of records, which, in one embodiment, are in the well-known "CKD" (count-key-data) format. The common memory subsystem 30 operates as a cache to cache information from the data stores 20($m$), and, as will be described below in greater detail, in performing the retrieval and storage operations, the host adapters 24($n$) operate to retrieve information from, and store information in, the common memory subsystem 30. If the particular record in the data store 20($m$) which is to be retrieved during a retrieval operation, or which is to be updated during a storage operation, is not cached in the common memory subsystem 30, the respective host adapter 24($n$) and the appropriate data store cooperate as necessary to enable the record to be cached, after which the host adapter 24($n$) can retrieve information from (in the case of a retrieval operation) or store updated information in (in the case of a storage operation) the common memory subsystem 30. In these operations, the host adapters 24($n$), data stores 20($m$) and common memory subsystem 30 communicate over the common bus 30, and in one embodiment access to the bus 13 is controlled by bus access control circuitry distributed among these components. In controlling access to the bus 13, the bus access control circuitry may use any of a number of known bus access arbitration techniques.

Each data store 20($m$) includes a storage controller 21($m$) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21($m$) connects to bus 13 and controls the storage of information which it receives thereover in the storage devices 22 connected thereto. In addition, each storage controller 21($m$) controls the retrieval of information from the storage devices 22 which are connected thereto for transmission to the common memory subsystem 30 for storage. In one embodiment, in which the storage devices 22 comprise magnetic disk storage devices, each storage device 22 stores information on disks organized in a plurality of cylinders, with each cylinder comprising one or more tracks, each of which can generally store one or more records.

As noted above, the common memory subsystem 30 operates to cache information from the data stores 20(m) for access by the hosts computers 11(n) through the host adapters 24(n). The common memory subsystem 30 includes a cache memory 31, a cache index directory 32 and a cache manager 33, which are generally similar to those described in U.S. Pat. No. 5,381,539 issued Jan. 10, 1995, entitled "System And Method For Dynamically Controlling Cache Management," U.S. Pat. No. 5,592,432, entitled "Cache Management System Using Time Stamping For Replacement Queue", issued Jan. 7, 1997 in the name of Natan Vishlitzky, et al., (hereinafter "the '432 patent"), and U.S. Pat. No. 5,751,993, filed Sep. 5, 1995, in the name of Yuval Ofek and Natan Vishlitzky, and entitled Cache Management System", (hereinafter referred to as the "Ofek applications"), all of which are assigned to the assignee of the present invention and incorporated herein by reference. The cache memory 31 operates as a cache buffer in connection with storage and retrieval operations, in particular caching update information provided by the host adapters 24(n) during a storage operation and information received from the data stores 20(m) which may be retrieved by the host adapters 24(n) during a retrieval operation.

Figure 2:
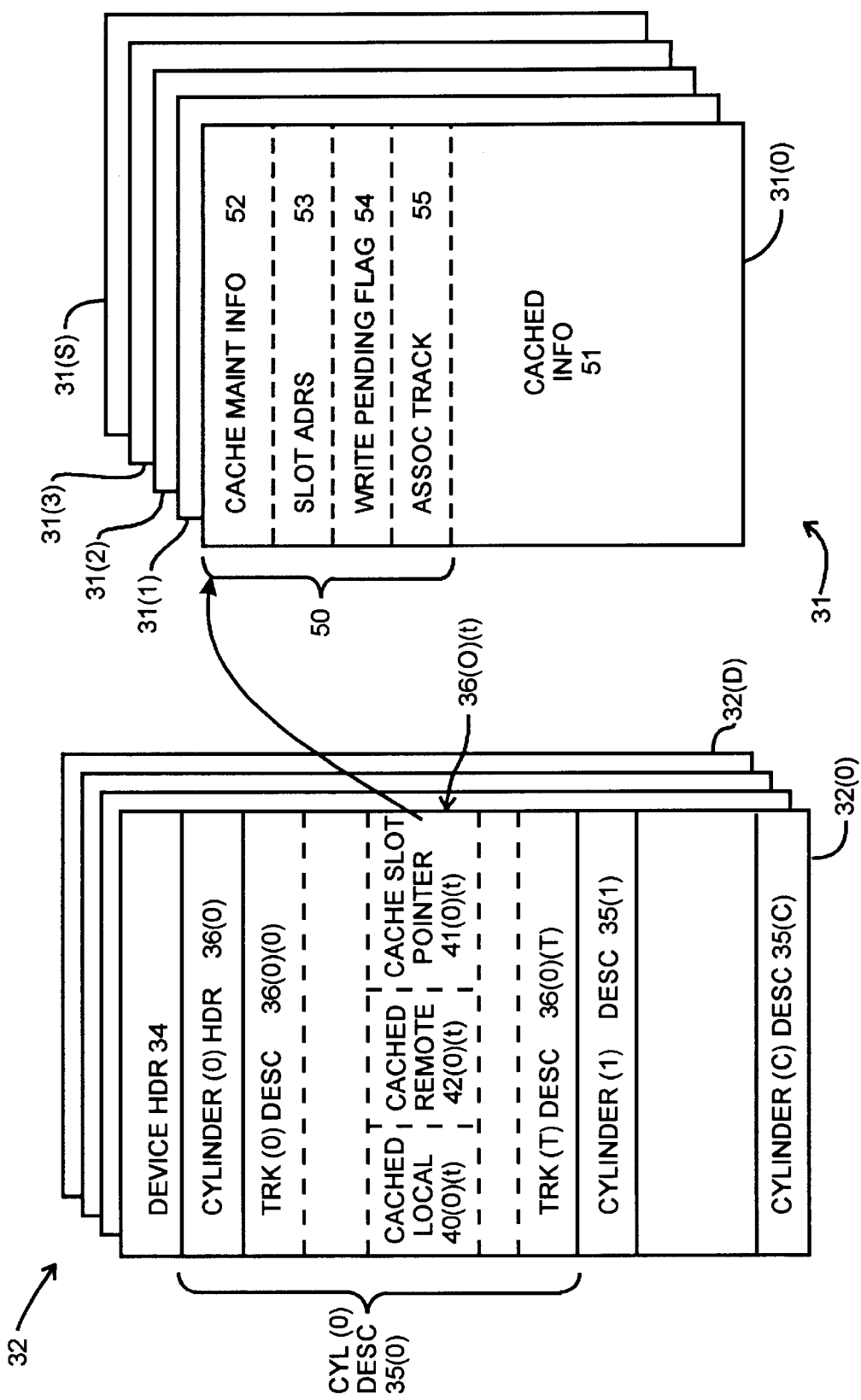
FIG. 2 depicts the organization of a cache memory and cache index directory useful in understanding the operation of the storage subsystem depicted in FIG. 1.
Figure 3:
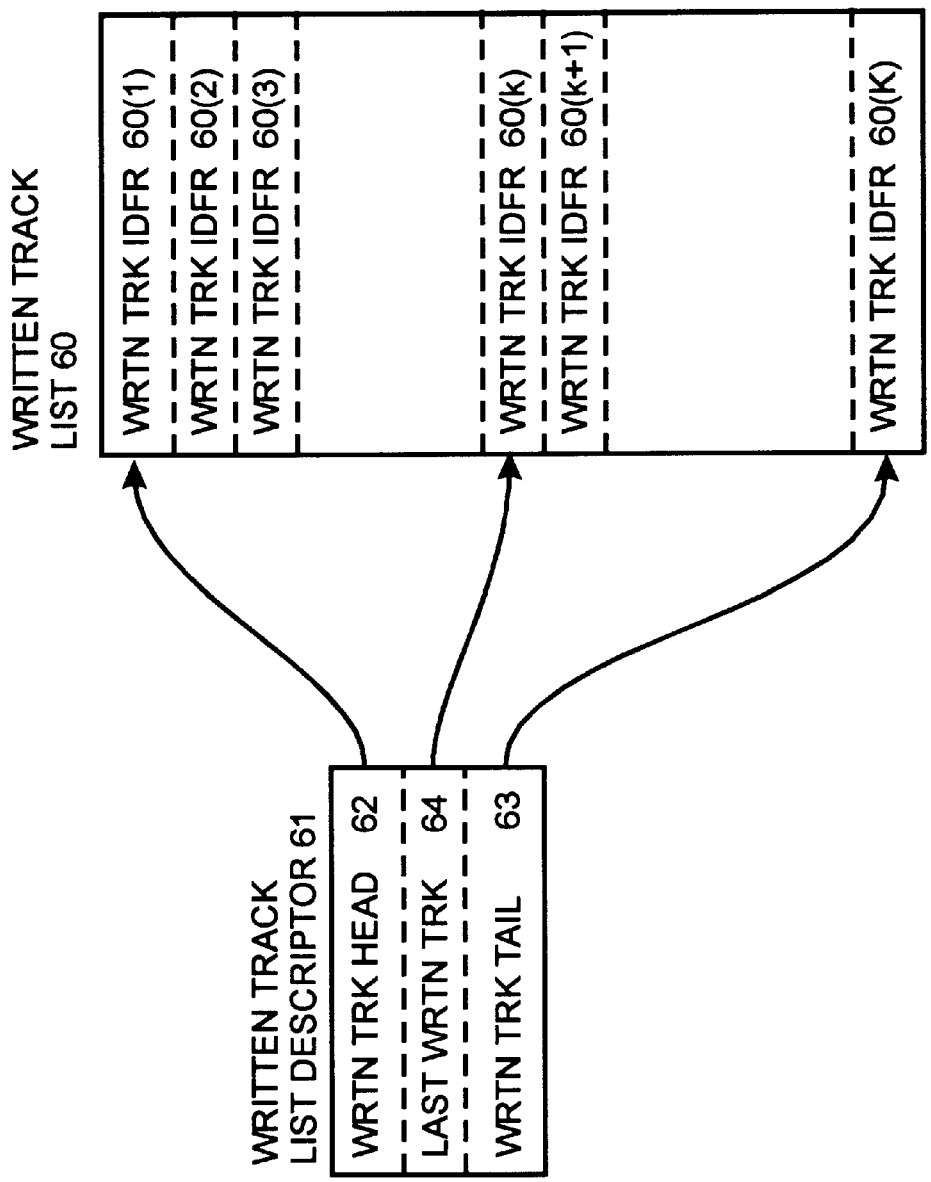
FIG. 3 depicts the structure of a written track list and written track list descriptor which are useful in understanding the invention.

The cache memory 31 and cache index directory 32 will generally be described in connection with FIG. 2. With reference to FIG. 2, the cache memory 31 includes a plurality of storage locations, which are organized in a series of cache slots 31(0) through 31(S) (generally identified by reference numeral 31(s)). The storage locations are, in turn, identified by a series of addresses, with the starting address of each cache slot being identified by a base address. The cache slots 31(s) provide the cache buffering for the information common memory subsystem 30 as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(0) through 35(c)(T) (generally identified by reference numeral 35(c)(t)), each of which is associated with one of the tracks in the cylinder 35(c). Each track descriptor 35(c)(t), in turn, includes information for the associated track of the storage device 22, including whether the track is associated with a cache slot 31(s) in the cache memory 31, and, if so, the identification of the cache slot 31(s) with which the track is associated. In one embodiment, each track descriptor 35(c)(t) includes a cached local flag 40(c)(t), a cache slot pointer 41(c)(t), and may also include other status and control information (not separately shown). The cached local flag 40(c)(t), if set, indicates that the track associated with the track descriptor 35(c)(t) is, in turn, associated with a cache slot. If the cached local flag 40(c)(t) is set, the cache slot pointer 41(c)(t) points to one of the cache slots 31(s), thereby associating the track with the respective cache slot 31(s). If the cached local flag 40(c)(t) is set, information from the track can be cached in the cache slot 31(s) identified by the cache slot pointer 41(c)(t) for retrieval by a host adapter 24(n) and updated information can be stored by a host adapter 24(n) in the cache slot 31(n) for later storage on the associated track storage.

Each cache slot 31(s) includes a cache slot header 50 and a cached information storage portion 51. Generally, the cached information portion 51 contains the information that is cached in the cache slot 31(s) for the track that is associated with the cache slot 31(s). The header portion 50 generally contains information concernig the cache slot 31(s), including information used to maintain the ordering of the cache slots in connection with the particular cache slot replacement algorithm selected for the cache memory 31, the identification of the track associated with the cache slot and information as to whether the cache slot contains updated information from a host adapter 24(n) which needs to be stored on the track associated with the cache slot 31(s).

More specifically, the cache slot's header portion 50 includes a cache maintenance information field 52, a slot address field 53, a write pending field 54, and an associated track identifier field 55, and may also include other status and control information (not separately shown). The cache maintenance information field 52 contains information used in connection with the particular cache slot replacement algorithm which is selected for the cache memory 31. For example, if a least-recently-used cache slot replacement algorithm or modified least-recently-used is used for the cache memory 31, the cache maintenance information field 52 will be used to link the cache slots 31(s) in the cache memory 31 in a doubly-linked list of cache slots, effectively linking the cache slots in an order corresponding to that in which they were most recently accessed by a storage controller 21(m) or host adapter 24(n). (The aforementioned Shagam and Ofek applications describe modified least-recently-used cache-slot replacement algorithms which can be used in one embodiment of the invention). The slot address field 53 identifies the address of the cache slot 31(s) in the cache memory 31. The write pending flag 54, if set, indicates that the cache slot contains updated information which needs to be transferred to the respective storage device 22 for storage on the associated track. If the write pending flag 74 is not set, the cache slot 31(s) does not contain updated information. It will be appreciated that, if the write pending flag 74 of the cache slot 31(s) is set, as described above, the cache maintenance information field 52 for the cache slot 31(s) will be updated so as to remove the cache slot 31(s) from the set of cache slots 31(s) which may be available for re-use in connection with the cache replacement algorithm selected for the cache memory 31 until the updated information has been stored on the associated track. After the updated information has been stored on the associated track, the write pending flag 54 can be cleared and the cache maintenance information field 52 can be updated to return the cache slot 31(s) to the list of cache slots 31(s) which are available for re-use. This will ensure that the cache slot 31(s) will not be re-used, in accordance with the cache slot replacement algorithm used for the cache memory 31 while the cache slot 31(s) contains updated information which has not been stored on the storage device 22.

Each of the host adapters 24(*n*) and each of the device controllers 21(*m*) includes a cache manager 25(*n*) and 23(*m*), respectively, to access to the cache memory 31, cache index directory 32 and cache manager memory 33. The particular operations performed during an access operation will depend on a number of factors, including the access operation to be performed, whether or not the information from the particular track to be accessed is cached in the cache memory 31, and whether or not the information in the respective cache slot 31(*s*) has been modified or updated by a host adapter's cache manager 25(*n*) during a storage operation. As described in the aforementioned Shagam application, the host adapters 24(*n*) typically perform storage and retrieval operations in connection with information that has been cached in the cache memory 31, and the device controllers 21(*m*) perform "staging" and "de-staging" operations to transfer information in the storage devices 22 to the cache memory 31 for buffering (the staging operations) and to transfer information from the cache memory 31 to the storage devices 22 for storage (the de-staging operations). In performing the staging and de-staging operations, the device controllers 21(*m*) generally transfer information to and from the cache memory 31 in units of at least a record, that is, they will during a staging operation transfer all of the information in a record from a storage device 22 to a cache slot 31(*s*) in the cache memory 31, and during a de-staging operation copy all of the information in respective updated records in the cache memory 31 to the storage device 22 for storage on the associated track.

The cache manager memory 33 maintains a number of work lists which are used to control operations by the host adapters 24(*n*) and storage controllers 21(*m*) during an access operation. In particular, the cache manager memory 33 includes a cache slot replacement list, a pending write list and various lists which the host adapters 24(*n*) and storage controllers 21(*m*) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots in accordance with the cache-slot replacement algorithm selected for cache memory 31. During a staging operation, the storage controller's cache manager 23(*m*) uses the cache slot replacement list to select a cache slot 31(*s*) into which it will load the information retrieved from a storage device. If the cache slot 31(*s*) does not contain updated information which has not been written to the storage device 22 which contains the track associated with the cache slot 31(*s*), it (that is, the cache slot 31(*s*) will be linked to the cache slot replacement list.

The pending write list is used to identify cache slots 31(*s*) which contain updated information, which has not been written to the storage device which contains the track associated with the cache slot 31(*s*). When a cache slot 31(*s*) contains updated information to be transferred to a storage device 22 as described above, it will be linked into the pending write list, not to the cache slot replacement list. During de-staging operations, the storage controllers' cache managers 23(*m*) will use the write pending list to identify cache slots which contain updated information which is to be written to the appropriate respective storage devices 22.

The staging operation coordination communication lists include a plurality of stage request lists and a plurality of stage completion lists, with one stage request list being associated with each data store 20(*m*) and one stage completion list being associated with each host computer 11(*n*). The host adapters' cache managers 25(*m*) use the stage request lists to store stage requests to be performed by the respective data stores 20(*m*), and the data stores' cache managers 23(*n*) use the stage completion lists to store stage completion messages to indicate to the respective host adapters' cache managers 25(*m*) that the stage requests have been completed.

Generally, a host adapter 24(*n*), during a retrieval operation, attempts to retrieve the information from the cache memory 31. However, if the information is not in the cache memory 31, it will enable the device controller 21(*m*) which controls the storage device 22 that contains the information to be retrieved to "stage" the information from the track which contains the information to be retrieved, that is, to enable the transfer of the information to be retrieved from the track which contains the information that is to be retrieved, into a cache slot 31 (*s*) in the cache memory 31. In that process, the host adapter 24(*n*) may select a cache slot 31(*s*) to be used by the storage controller 21(*m*) into which the data is to be staged, the selection being made from the cache slot replacement list as described above. After the information to be retrieved is in the cache slot 31(*s*) in the cache memory 31, the host adapter 24(*n*) will retrieve the information from the cache slot 31(*s*).

Similarly, during a storage operation, the host adapter 24(*n*) will store the information in a cache slot 31(*s*). If the track containing the record to be updated is associated with a cache slot when the host adapter 24(*n*) initiates a storage operation, as will be indicated by the cached local flag 40(*c*)(*t*) in the track's descriptor 36(*c*)(*t*) in the cache index directory 32, the host adapter 24(*n*) will store the updated information in the cache slot 31(*s*) associated with the track, as identified by the cache slot pointer 41(*c*)(*t*); this may occur, for example, if information from the track has recently been staged in the cache memory 31 or if the same or another record stored on the track has recently been updated. However, if the track is not associated with a cache slot when the host adapter 24(*n*) initiates a storage operation, the host adapter 24(*n*) will select a cache slot to be associated with the track, and store the updated information in the selected cache slot.

More specifically, as described in the aforementioned Shagam application, during a retrieval operation, the cache manager 25(*n*) of the initiating host adapter 24(*n*) will initially access the cache index table 32(*d*) in the cache index directory 32 associated with the storage device 22 in which the information to be retrieved is stored, in particular accessing the track descriptor 36(*c*)(*t*) of the cylinder descriptor 36(*c*) to determine, from the condition of the cached local flag 40(*c*)(*t*), whether the information from the track is cached in a cache slot 31(*s*) in the cache memory. If the cached local flag 40(*c*)(*t*) indicates that information from the track is cached in a cache slot 31(*s*), the cache manager 25(*n*) uses the cache slot pointer 41(*t*) to identify the particular cache slot 31(*s*) in which the information is cached and retrieves the required information from the cache slot 31(*s*).

On the other hand, if the cache manager 25(*n*) determines from the cached local flag 40(*c*)(*t*) that the information from the track is not cached in a cache slot 31(*s*), it will generate a stage request to enable the storage controller 21(*m*) for the storage device 22 which maintains the information to be retrieved, load the stage request in the stage request queue for the data store 21(*m*) and notify the storage controller 21(*m*) that a stage request had been loaded in the stage request queue. At some point after receiving the notification, the storage controller 21 (*m*) will retrieve the stage request and perform a staging operation in response thereto. In performing the staging operation, the storage controller 21(m) will retrieve the information from the requested track, use the above-described cache slot replacement list to select a cache slot 31(s), load the information into cache slot 31(s) and update the track descriptor 36(c)(t) in the cache index table 32(d) associated with the storage device 22 to indicate that the information from the track is in the cache slot 31(s), in particular setting the cached local flag 40(c)(t) and loading a pointer to the cache slot in the cache slot pointer 41(c)(t).

After the storage controller 21(m) has completed the staging operation, it will load a staging completed message in the stage completion list in the cache manager memory 33 associated with the host computer 11(n) which issued the staging request, and notify the host computer's cache manager 25(n) that a stage completed message has been loaded therein. At some point after receiving the notification, the host computer's cache manager 25(n) can repeat the operations performed in connection with the retrieval request as described above, in particular accessing the cache index table 32(d) in the cache index directory 32 associated with the storage device 22 in which the information to be retrieved is stored, in particular accessing the track descriptor 36(c)(t) of the cylinder descriptor 36(c) to determine, from the condition of the cached local flag 40(c)(t), whether the information from the track is cached in a cache slot 31(s) in the cache memory and, if so, use the cache slot pointer 41(t) to identify the particular cache slot 31(s) in which the information is cached and retrieve the required information from the cache slot 31(s). Since at this point the cached local flag 40(c)(t) should indicate that the information from the track is cached in a cache slot 31(s), the host adapter's cache manager 25(n) should be able to complete the retrieval operation.

During a storage operation, the cache manager 25(n) of the initiating host adapter 24(n) will initially access the cache index table 32(d) in the cache index directory 32 associated with the storage device 22 in which the information to be updated is stored, in particular accessing the track descriptor 36(c)(t) of the cylinder descriptor 36(c) to determine, from the condition of the cached local flag 40(c)(t), whether the information from the track is cached in a cache slot 31(s) in the cache memory. If the cached local flag 40(c)(t) indicates that information from the track is cached in a cache slot 31(s), the cache manager 25(n) uses the cache slot pointer 41(t) to identify the particular cache slot 31(s) in which the information is cached and loads the update information into the cache slot 31(s). In addition, the host adapter's cache manager 25(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 25(n) determines from the cached local flag 40(c)(t) that the information from the track is not cached in a cache slot 31(s), it will select a cache slot 31(s) to associated with the track from cache slot replacement list and store the updated information in the cache slot 31(s). In selecting the cache slot 31(s), the cache manager 25(n) will update the track descriptor 36(c)(t) in the cache index table 32(d) associated with the storage device 22 to indicate that the information from the track is in the cache slot 31(s), in particular setting the cached local flag 40(c)(t) and loading a pointer to the cache slot 31(s) in the cache slot pointer 41(c)(t). In addition, the cache manager 25(n) will update the cache maintenance information field 52 to link the selected cache slot to the write pending list instead of the cache slot replacement list, and will set the write pending flag 54.

As described above, the data stores' cache managers 23(m) also perform de-staging operations using the pending write list to identify cache slots 31(s) which contain updated information to be written back to the original storage device 22 and track whose information was cached in the respective cache slots 31(s). When a cache slot 31(s) is de-staged, since at that point the information in the cache slot 31(s) corresponds to the information on the respective storage device 22, the data store's cache manager 23(m) which performs the de-staging operation will remove the cache slot's identification from the pending write list and return it to the replacement list so that the cache slot 31(s) can be removed. It will be appreciated, however, that a host computer's cache manager 25(n) may perform a number of retrieval operations and/or storage operations in connection with information in the same cache slot 31(s) after the information in the track cached in the slot has been staged and before it can be de-staged, and so information in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 25(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with information cached for the same storage device 22, cylinder and track, without being reused.

In addition, in one embodiment one or more of the cache slots 31(s) may be permanently associated with respective ones of the tracks in the storage devices 22, and in that connection will not be available for re-use in connection with the selected cache slot replacement algorithm. This may be done, for example, at the request of a host computer 11(n) which may be aware that the information contained on the track will be accessed relatively often, or that it will need access to the information with a minimum latency period which may not be available if the information in the track would need to be transferred from the respective storage device 22, or for other reasons which will be apparent to those skilled in the art. To accommodate that, the header 50 of the cache slot 31(s) is also provided with a permanently cached flag (not separately shown) which, if set, indicates that the cache slot 31(s) is not available for re-use. Such a cache slot 31(s) will, if a host adapter 24(n) updates the information contained therein, be linked to the write pending list so that the updated information contained therein can be de-staged; however, after the updated information has been de-staged, the cache slot 31(s) will not be linked to the cache slot replacement list.

As noted above, the slave mass storage subsystem 12S is generally similar to master mass storage subsystem 12M. In the embodiment depicted in FIG. 1, the slave mass storage subsystem 12S does not connect to host computers 11(n), and thus need not include host adapters 24(n) and associated cache managers 25(n). The slave mass storage subsystem 12S will, however, include data stores, a common memory subsystem similar to that described above, and a remote interface for enabling the slave mass storage subsystem 12S to communicate with the master mass storage subsystem 12M over the communication link 16. The data stores in the slave mass storage subsystem will store a copy of the information stored in the data stores 20(*m*) of the mass storage subsystem 12M in a mirrored manner. To accomplish the mirroring, when a host adapter 24(*n*) in the master mass storage subsystem 12M performs a storage operation to store update data for a particular track in the master mass storage subsystem's cache memory 31 as described above in connection with FIGS. 1 and 2, it also enables the remote interface 15 to transfer a storage request over the communication link 16 to the slave mass storage subsystem 12S. In response to the storage request, the slave mass storage subsystem's remote interface will perform a corresponding storage operation in connection with the slave mass storage subsystem 12S to enable the updated information to be stored in the slave mass storage subsystem's cache memory. At some point later, the appropriate data store in the slave mass storage subsystem's will perform a de-staging operation as described above, to transfer the update information appropriate storage device of the slave mass storage subsystem which, in turn, stores the update information on the appropriate track.

Generally, a slave mass storage subsystem such as subsystem 12S is only used to in connection with storage and de-staging operations in connection with storage requests received from the mass storage subsystem 12M. In that case, since such storage operations are performed at a much lower rate than retrieval operations, the cache memory in the slave mass storage subsystem 12S would not otherwise be extensively used. In accordance with the invention, to enhance usage of the slave mass storage subsystem's cache memory and reduce operations in connection with the master mass storage subsystem's cache memory 31, when the host adapter 24(*n*) initiates a retrieval operation in connection with information for a predetermined number of tracks for which updated information was previously stored in connection with a storage operation, the host adapter 24(*n*) will essentially enable the remote interface 15 to perform a staging operation to obtain the information from the cache memory of the slave mass storage subsystem 12S and store it in the cache memory 31 as described above.

Depending on at least some conditions, in particular, the speed of the communication link 16 interconnecting the master and slave mass storage subsystems 12M and 12S, and the degree to which the remote interfaces of the master and slave mass storage subsystems 12M and 12S are busy with other communications when the host adapter 24(*n*) wishes to enable the remote interface 15 to perform a staging operation, such a staging operation can be faster than a staging operation to obtain the information from the appropriate storage device 22 of either the master mass storage subsystem 12M or the slave mass storage subsystem 12S, and so the host adapter 24(*n*) can complete the retrieval operation faster than if the information were to be obtained from the storage device 22. It will be appreciated that, if the remote interface 15 is busy with other communications to that such an extent that the time required for the remote interface 15 to complete a staging operation from the slave mass storage subsystem 12S would take longer than a staging operation from the respective storage device 22 of the master mass storage subsystem 12M, the host adapter 24(*n*) can instead enable the data store 20(*m*) of the master mass storage subsystem 12M to perform a staging operation to transfer the information to be retrieved to the cache memory 31. To enable the host adapter 24(*n*) to determine whether a staging operation from the slave mass storage subsystem 12S would likely require less time than a staging operation from a storage device 22 of the master mass storage subsystem 12M, in one embodiment the remote interface 15 will provide the host adapter 24(*n*) with information as to its busy status in response to a request from the host adapter, and the host adapter 24(*n*) can use the busy status in determining whether to enable the remote interface 15 or the master mass storage subsystem 12M to perform a storage operation.

To accommodate the invention, each track descriptor 36(*c*)(*t*) is provided with a cached remote flag 42(*c*)(*t*) and the common memory subsystem 30 of the master mass storage subsystem 12M is further provided with a written track list 60, and a written track list descriptor 61. The cached remote flag 42(*c*)(*t*) indicates whether the track associated with the track descriptor 36(*c*)(*t*) is cached in the cache memory of the slave mass storage subsystem 12S. When information from the track associated with the track descriptor 36(*c*)(*t*) is in the cache memory of the slave mass storage subsystem 12S, the cached remote flag 42(*c*)(*t*) will be set, and otherwise the flag will be cleared. Normally, when a host adapter performs a storage operation to store information in a cache slot in the cache memory 31 of the master mass storage subsystem 12M and to provide the information to the remote interface 15 to transfer the information to the slave mass storage subsystem 12S, the cached remote flag 42(*c*)(*t*) as well as the cached local flag 40(*c*)(*t*) in the track descriptor 36(*c*)(*t*) that is associated with the track for which information is being stored will be in a set condition, indicating that information associated with the track associated with the track descriptor 36(*c*)(*t*) is in the cache memories of the respective subsystems 12M and 12S. The cached remote flag 42(*c*)(*t*) will be conditioned by the host adapter 24(*n*) as described below in connection with FIG. 4.

The written track list 60 identifies, at each point in time the predetermined number of tracks for which information was previously updated. The written track list comprises a plurality of entries 60(1) through 60(K) (generally identified by reference numeral 60(*k*)) each of which receives a track identifier, the track identifier including identifiers for the storage device 22, cylinder and track within the cylinder, thereby to uniquely identify the track in the master mass storage subsystem 12M. Each entry 60(*k*) comprises a storage location in the common memory subsystem 30, and the entries comprise a series of such storage locations. When a host adapter 24(*n*) updates information for a track, it will load the track identifier for the track in an entry 60(*k*) in the written track list 60, the entry 60(*k*) being selected as described below.

The written track list descriptor 61 defines the beginning and end of the series of storage locations for the entries 60(*k*) of the written track list, and also identifies the particular entry in which a track identifier was last loaded by a host adapter 24(*n*). The written track list descriptor 61 includes a plurality of pointers, including a written track list head pointer 62, a written track list tail pointer 63 and a last written track pointer 64, which are manipulated by the host adapters 24(*n*) so as to provide the written track list 60 as a circular list. The written track list head pointer 62 and written track list tail pointer 63 identify the first and last of the series of storage locations comprising the entries 60(*k*) of the written track list 60. The last written track pointer 64 identifies the storage location comprising the entry 60(*k*) into which a track identifier was most recently written, thereby identifying the entry 60(*k*) containing the track identifier identifying the track for which update information was most recently stored in the cache memory 31 of the master mass storage subsystem 12M and also, generally, the track identifier identifying the track for which update information was most recently stored in the cache memory of the slave mass storage subsystem 12S.

To further accommodate this aspect of the invention, when a host adapter 24(n) stores update information for a track in the cache memory 31 of the master mass storage subsystem 12M, it will increment the last written track pointer 64 to point to the next entry 60(k+1) of the written track list 60. If the last written track pointer 64 currently points to the last entry 60(K) in the written track list 60, when the host adapter 24(n) increments the last written track pointer 64, it will enable the last written track pointer 64 to point to the first entry 60(1) in the written track list 60, that is, the entry 60(1) pointed to by the written track head pointer 62, thereby to enable the written track list 60 to be used as a circular list. Since the written track list 60 is operated as a circular list, the entry 60(k) that is pointed to by the incremented last written track pointer 64 contains the track identifier for the least recently updated track among the tracks identified by the track identifiers in track identifier list 60.

In addition, the head adapter 24(n) performs several operations in connection the entry 60(k) pointed to by the incremented last written track pointer 64, and in connection with the track descriptors 36(c)(t) for the track whose track identifier is currently contained in the entry 60(k+1) and for the track for which update information is to be stored. In particular, the host adapter 24(n) will:

(i) clear the cached remote flag 42(c)(t) of the track descriptor 36(c)(t) for the track whose track identifier is currently contained in the entry 60(k+1);

(ii) in the master mass storage subsystem 12M, link the cache slot 32(s) associated with the track for which information is being stored to the write pending list;

(iii) load in the entry 60(k+1) of the written track list 60 the track identifier for the track for which it (that is, the host adapter 24(n)) is storing information;

(iv) set the cached remote flag 42(c)(t) of the track descriptor 36(c)(5) for the track for which it (that is, the host adapter 24(n)) is storing information (if the cached local flag 40(c)(t) is not already set); and (v) load a value in the associated cache slot pointer 41(c)(t) indicating that the track is associated with a cache slot in the slave mass storage subsystem 12S.

In addition:

(vi) in the master mass storage subsystem 12M, when a storage controller 21(m) performs a de-staging operation in connection with a cache slot 31(s) in which information has been stored, when it returns the cache slot 31(s) from the write pending list to the cache slot replacement list, it will insert the cache slot 31(s) proximate the head of the list, so that the cache slot 31(s) can be re-used relatively soon after the cache slot has been de-staged; but (vii) in the slave mass storage subsystem 12S when a storage controller 21(m) performs a de-staging operation in connection with a cache slot 31(s) in which information has been stored, when it returns the cache slot 31(s) from the write pending list to the cache slot replacement list, it will insert the cache slot 31(s) either at the tail of the list, so that the cache slot 31(s) will likely not be re-used relatively soon after the cache slot has been de-staged; and (viii) as described above, (A) if a host adapter 24(n), during a retrieval operation in connection with a track, determines that the cached local flag 40(c)(t) of the track's track descriptor is set, it will initiate a retrieval from the cache slot 31(s) pointed to by the cache slot pointer 41(c)(t); but (B) if a host adapter 24(n), during a retrieval operation in connection with a track, determines that the cached local flag 40(c)(t) of the track's track descriptor is not set, but the cached remote flag 42(c)(t) is set, it will initiate a retrieval from the slave mass storage subsystem 12S, but (C) if a host adapter 24(n), during a retrieval operation in connection with a track, determines that neither the cached local flag 40(c)(t) nor the cached remote flag 42(c)(5) of the track's track descriptor 36(c)(t) is set, it will enable the appropriate data store 20(m) of the master mass storage subsystem 12M to perform a staging operation in connection with the track, and thereafter retrieve the information from the cache slot in which the information from the track was staged.

It will be appreciated that, for operation (viii)(B) above, and as described above, prior to initiating a retrieval from the slave mass storage subsystem 12S, the host adapter 24(n) can determine the busy status of the remote interface 15 and determine therefrom whether to enable the retrieval from the slave mass storage subsystem 12S, or to enable the appropriate data store 20(m) of the mass storage subsystem 12M to perform the storage operation (operation (viii)(C) above).

As a result of the operations (i) through (viii) described above in connection with this aspect if the invention, when a track is updated, from item (vi) above, the cache slot associated with the track in the master mass storage subsystem 12M will be re-used within a relatively short time, but, from item (vii) above, the cache slot associated with the track in the slave mass storage subsystem 12S will not be re-used for a relatively long time after the update. Accordingly, the cache memory of the slave mass storage subsystem 12S will generally not store information which is duplicative of information stored in the cache memory of the master mass storage subsystem 12M. Thus, the combined caches of the master and slave mass storage subsystems 12M and 12S will effectively be caching more information than the cache memory of either one individually. Since the host adapters 24(n) can access information in the cache memories of both the master and slave mass storage subsystems 12M and 12S (from item (viii) above), the effective capacity of both cache memories is available to them (that is, the host adapters 24(n)), which can enhance response times in connection with retrieval requests.

In addition, since the written track list 60 is operated as a circular list, the track whose identifier is contained in the entry 60(k) pointed to by the incremented last written track pointer 64 is the track in which information was least recently stored. Thus, by storing the track identifier for the track in which information is currently being stored in the entry 60(k+1) of the written track list 60 pointed to by the incremented last written track pointer 44, the host adapters 24(n) ensure that the written track list 60 ensures that the written track list 60 always identifies the "K" tracks for which information was stored in the cache memory 31 of the master mass storage subsystem 12M, as well as in the cache memory of the slave mass storage subsystem 12S. Generally, if information from a track which has been updated will be accessed after the track has been updated, the access will be within a relatively short time after the update, and, if the written track list is of sufficient length, the likelihood will be relatively high that, when a host adapter 24(*n*) wishes to retrieve information from a track which has recently been updated, the information will be available from the cache memory of the slave mass storage subsystem 12S.

Figure 4:
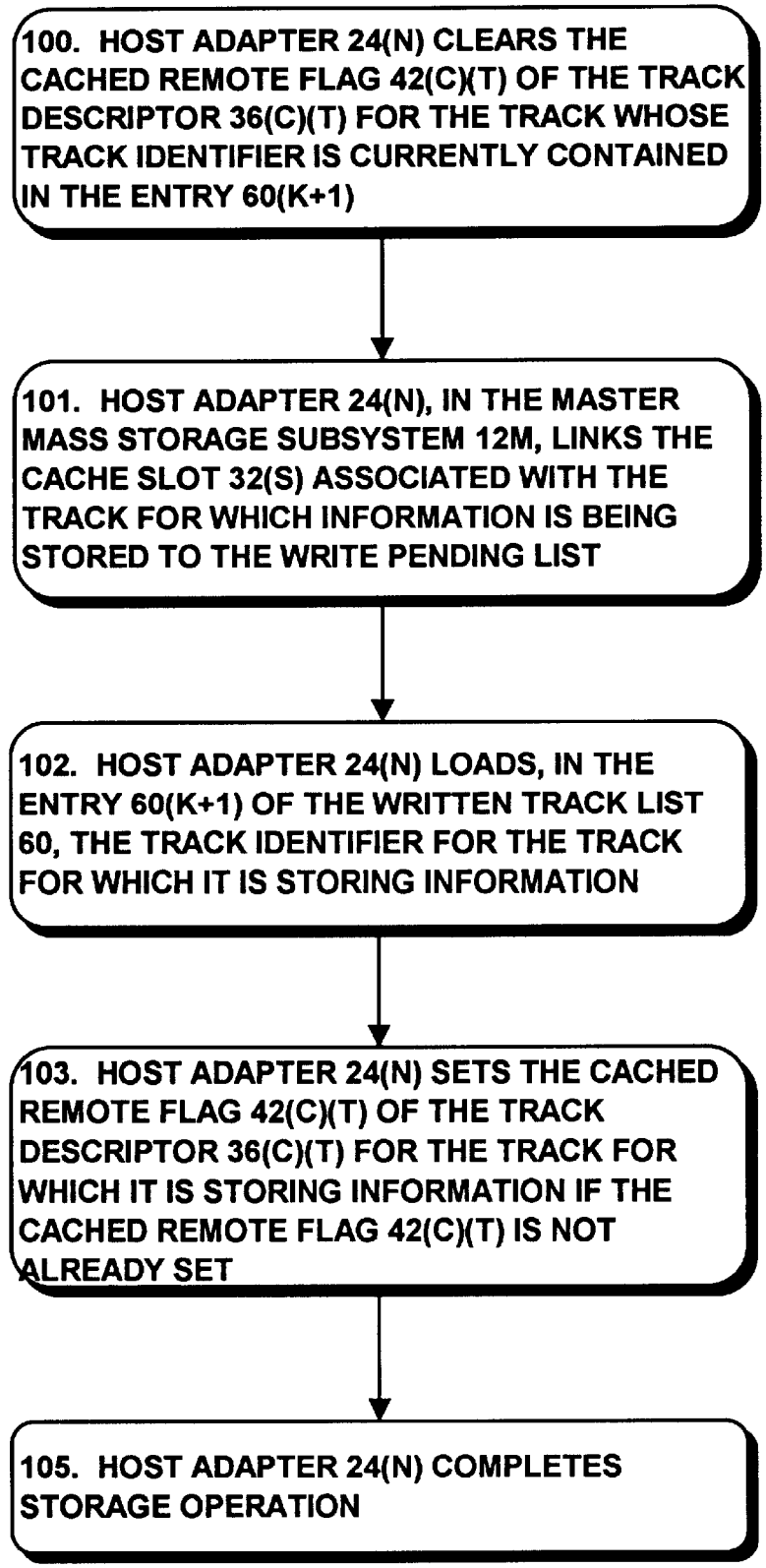
FIGS. 4 and 5 are flow-charts which are useful in understanding the invention.
Figure 5:
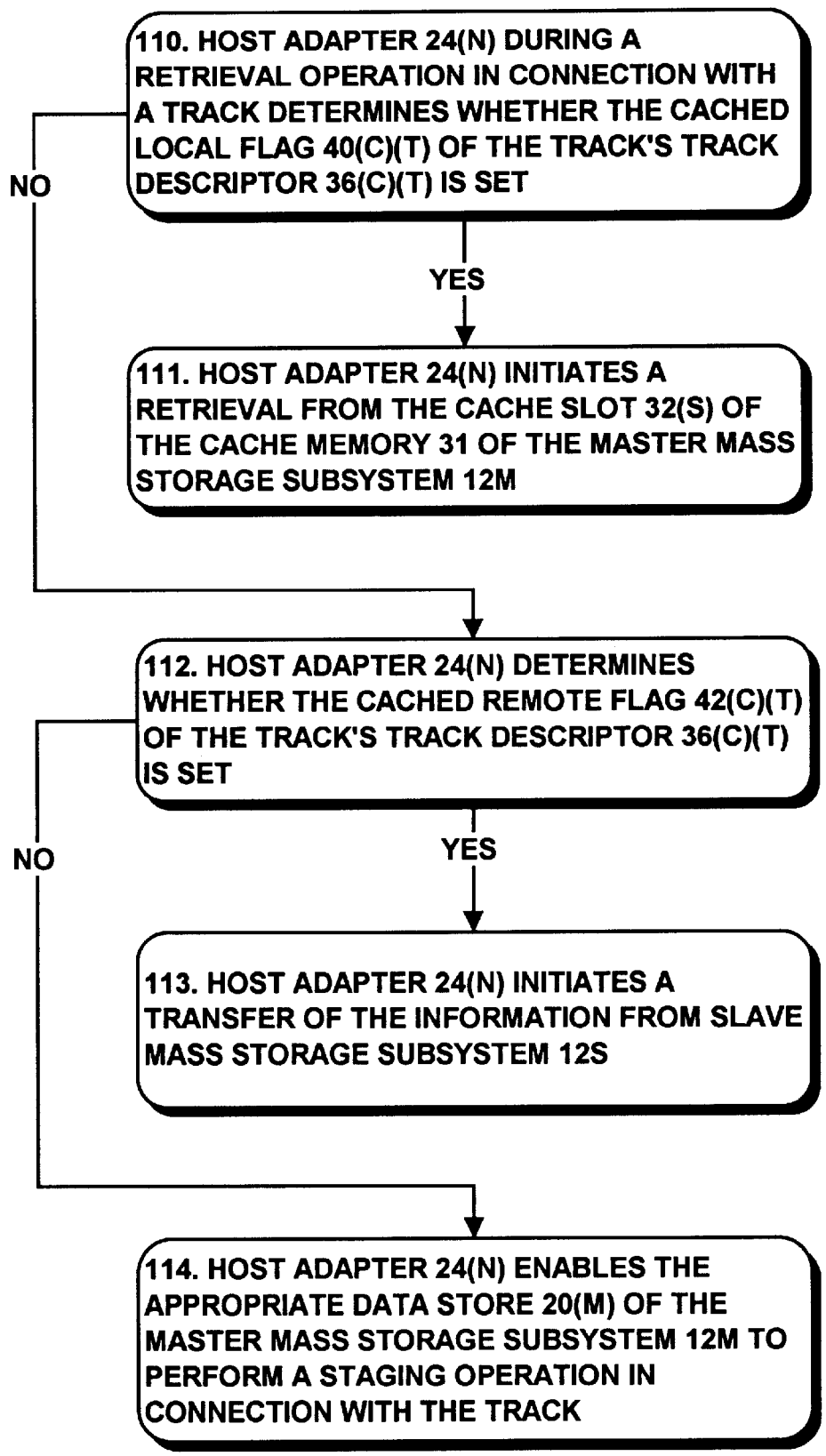

Operations described above in connection with items (i) through (v) are depicted on the flow-chart in FIG. 4 and operations described above in connection with item (viii) are depicted in FIG. 5. Since the operations as depicted in those flow-charts will be readily apparent to those skilled in the art from the above description, the flow-charts in those FIGS. will not be separately described in this specification.

It will be appreciated that numerous modifications may be made to the arrangement in accordance with the first aspect of the invention as described above. For example, as noted above, if the host adapter 24(*n*) determines that the track is cached in the slave mass storage subsystem 12S, it will enable the remote interface 15 to initiate a staging operation to transfer the track from the cache memory of the slave mass storage subsystem 12S to a cache slot 31(*s*) of the cache memory 31 of the master mass storage subsystem 12M, after which it (that is, the host adapter 24(*n*)) will retrieve the information from the cache slot 31(*s*). It will be appreciated that, instead of that, the host adapter 24(*n*) and remote interface 15 can, in connection with retrievals of information from the cache memory of the slave mass storage subsystem 12S, operate in a mode in which the remote interface 15 transfers the information to be retrieved directly to the respective host adapter 24(*n*).

In addition, as described above, to indicate that a track's track identifier is listed in the written track list 60, thus indicating that the information from a track has recently been updated and, thus, that the track is cached in the cache memory of the slave mass storage subsystem 12S, the host adapter 24(*n*) provides a predetermined value in the cache slot pointer 41(*c*)(*t*) of the track's track descriptor 36(*c*)(*t*) so indicating. Instead, the track descriptor 36(*c*)(*t*) can be provided with a flag (not shown) which the host adapter 24(*n*) can set when loading the track identifier in the particular entry 60(*k*+1) of the written track list pointed to by the incremented last written track pointer 64 as described above (item (iii) above) and reset contemporaneous with clearing of the cached local flag 40(*c*)(*t*) of the track descriptor 36(*c*)(*t*) for the track whose track identifier is initially contained in the entry 60(*k*+1) (item (i) above).

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the U.S. is:

1. A digital data storage system comprising a master mass storage subsystem and a slave mass storage subsystem storing information in a mirrored storage arrangement, A. the slave mass storage subsystem including at least one slave data store and a slave cache memory, the slave mass storage subsystem being configured to receive update information from said master mass storage subsystem for storage in said slave data store, the slave mass storage subsystem being configured to initially cache said received update information in said slave cache memory, the slave mass storage subsystem further being configured to receive retrieval requests for information items stored in said slave cache memory and transfer the requested information item to the master mass storage subsystem;

B. the master mass storage subsystem including at least one master data store, a master cache memory, and a host adapter, the master data store storing information to be accessed by said host adapter, the host adapter being configured to
      (i) during a storage operation, provide an updated information item to the slave mass storage subsystem during a storage operation, and
      (ii) during a retrieval operation, initially determine whether an information item to be retrieved is in the master cache memory, and, if it is not, determine whether the information item is in said slave cache memory in said slave mass storage subsystem and, if so, generate a retrieval request to initiate a retrieval of said information item from said slave mass storage subsystem, each information item being associated with a descriptor, the descriptor including a cached remote flag indicating whether the associated information item is cached in said slave cache memory, the host adapter being further configured to use the cached remote flag during a retrieval operation to determine whether the information item to be retrieved is cached in said slave cache memory.

2. A digital data storage system as defined in claim 1 in which, during a storage operation, said host adapter is configured to condition the cached remote flag of the descriptor associated with the information item being updated during the storage operation.

3. A digital data storage system as defined in claim 2 in which the host adapter is configured to maintain the cached remote flags of the respective descriptors such that a predetermined maximum number of said cached remote flags indicate that the information item to be retrieved is cached in said slave cache memory.

4. A digital data storage system as defined in claim 2 in which said master mass storage subsystem further includes a written information item list identifying the predetermined maximum number of most recently updated information items, the host adapter being configured to use the written information item list during a storage operation in maintaining the cached remote flags of the respective descriptors such that a predetermined maximum number of said cached remote flags indicate that the information item to be retrieved is cached in said slave cache memory.

5. A digital data storage system as defined in claim 4 in which:

A. the written information item list is in the form of a circular list including a plurality of entries each for storing an information item identifier, and including a pointer pointing to the entry which contains the information item identifier for the information item which was least recently updated among the predetermined maximum number of most recently updated information items, and B. the host adapter being configured to, during a storage operation in connection with an information item:
   i. condition the cached remote flag of the descriptor associated with the information item identified by the information item identifier in the entry pointed to by the pointer to indicate that the information item to be retrieved is not cached in said slave cache memory, and
   ii. load into the entry pointed to by the pointer the information item identifier for the information item.

6. A digital data storage system comprising a master mass storage subsystem and a slave mass storage subsystem storing information in a mirrored storage arrangement, A. the slave mass storage subsystem including at least one slave data store and a slave cache memory, the slave mass storage subsystem being configured to receive update information from said master mass storage subsystem for storage in said slave data store, the slave mass storage subsystem being configured to initially cache said received update information in said slave cache memory, the slave mass storage subsystem further being configured to receive retrieval requests for information items stored in said slave cache memory and transfer the requested information item to the master mass storage subsystem;

B. the master mass storage subsystem including at least one master data store, a master cache memory, and a host adapter, the master data store storing information to be accessed by said host adapter, the host adapter being configured to
   (i) during a storage operation, provide an updated information item to the slave mass storage subsystem during a storage operation, and maintain slave cached information identifying updated information items cached by said slave mass storage subsystem, and
   (ii) during a retrieval operation, initially determine whether an information item to be retrieved is in the master cache memory, and, if it is not, determine from the slave cached information whether the information item is in said slave cache memory in said slave mass storage subsystem and, if so, generate a retrieval request to initiate a retrieval of said information item from said slave mass storage subsystem.

7. A master mass storage subsystem for use in connection with a slave mass storage subsystem storing information in a mirrored storage arrangement, the slave mass storage subsystem including at least one slave data store and a slave cache memory, the slave mass storage subsystem being configured to receive update information from said master mass storage subsystem for storage in said slave data store, the slave mass storage subsystem being configured to initially cache said received update information in said slave cache memory, the slave mass storage subsystem further being configured to receive retrieval requests for information items stored in said slave cache memory and transfer the requested information item to the master mass storage subsystem; the master mass storage subsystem comprising:

A. at least one master data store;

B. a master cache memory; and

C. a host adapter, the master data store storing information to be accessed by said host adapter, the host adapter being configured to
   (i) during a storage operation, provide an updated information item to the slave mass storage subsystem during a storage operation, and maintain slave cached information identifying updated information items cached by said slave mass storage subsystem, and
   (ii) during a retrieval operation, initially determine whether an information item to be retrieved is in the master cache memory, and, if it is not, determine from the slave cached information whether the information item is in said slave cache memory in said slave mass storage subsystem and, if so, generate a retrieval request to initiate a retrieval of said information item from said slave mass storage subsystem.

* * * * *